US006381470B1

United States Patent
Griffith et al.

(10) Patent No.: US 6,381,470 B1
(45) Date of Patent: Apr. 30, 2002

(54) AUTOMATIC REASSIGNMENT OF A TELEPHONE NUMBER OF A WIRELESS TERMINAL BASED ON LOCATION OF THE WIRELESS TERMINAL

(75) Inventors: Gary L. Griffith, Arvada; Larry J. Hardouin, Westminster, both of CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/198,990

(22) Filed: Nov. 23, 1998

(51) Int. Cl.⁷ .................................................. H04Q 7/20
(52) U.S. Cl. ........................ 455/551; 455/419; 455/432
(58) Field of Search .............................. 455/551, 440, 455/414, 418, 419, 461, 465, 456, 432

(56) References Cited

U.S. PATENT DOCUMENTS

| | | | | |
|---|---|---|---|---|
| 5,428,666 A | * | 6/1995 | Fyfe ............................ | 379/58 |
| 5,465,286 A | | 11/1995 | Clare et al. .................... | 379/34 |
| 5,603,084 A | * | 2/1997 | Henry ........................ | 455/33.1 |
| 5,625,668 A | * | 4/1997 | Loomis ........................ | 379/58 |
| 5,768,360 A | | 6/1998 | Reynolds et al. ........... | 379/220 |
| 5,784,693 A | * | 7/1998 | Barber ........................ | 455/434 |
| 5,841,854 A | | 11/1998 | Schumacher et al. ....... | 379/265 |
| 5,914,951 A | | 6/1999 | Bentley et al. ............. | 370/352 |
| 6,002,930 A | * | 12/1999 | Sadrozinski ................. | 455/432 |
| 6,041,231 A | * | 3/2000 | Suzuki ........................ | 455/422 |

* cited by examiner

Primary Examiner—Daniel Hunter
Assistant Examiner—Nick Corsaro
(74) Attorney, Agent, or Firm—David Volejnicek

(57) ABSTRACT

When a wireless terminal enters a new location, the telephone number assigned to the wireless terminal is automatically changed to a telephone number assigned to that location based on an assignment level of the wireless terminal for that location. The features associated with the wireless terminal will also be changed to the features assigned to the location. In addition, this invention allows flexibility for the telephone number of the wireless terminal to remain fixed and not to be changed to a telephone number assigned to a particular location. Further, a wireless terminal has a plurality of assignment levels with different assignment levels being utilized for different locations. This allows the user of the wireless terminal to perform different functions within different locations. In addition, each wireless terminal has a personal telephone number assigned to it. The wireless telephone can use either its personal telephone number or the telephone number of the present location for purposes of caller identification during call originations.

9 Claims, 10 Drawing Sheets

| TABLE 1 | | | |
|---|---|---|---|
| PHYSICAL NUMBER | ASSIGNED TELEPHONE NUMBER | EXCLUDED LOCATIONS | PRESENT LOCATION |
| 112 | 538-3901 | 101 | 103 |
| 113 | 538-2921 | | 101 |
| 114 | 538-1901 | | 104 |
| | | | |
| | | | |
| | | | |

*FIG. 2*

| TABLE 1 | | | |
|---|---|---|---|
| PHYSICAL NUMBER | ASSIGNED TELEPHONE NUMBER | EXCLUDED LOCATIONS | PRESENT LOCATION |
| 112 | 538-1911 | 101 | 104 |
| 113 | 538-2921 | | 101 |
| 114 | 538-1901 | | 104 |
| | | | |
| | | | |
| | | | |

*FIG. 4*

| TABLE 2 |||||||
|---|---|---|---|---|---|---|
| LOCATION | ASSIGNED TELEPHONE NUMBERS AND TERMINALS ||||||
| | NUMBER | TER. | NUMBER | TER. | NUMBER | TER. |
| 101 | 538-2901 | | 538-2902 | | 538-2903 | |
| 102 | 538-7901 | | 538-7902 | | 538-7903 | |
| 103 | 538-3901 | 112 | 538-3902 | | 538-3903 | |
| 104 | 538-1901 | 114 | 538-1902 | | 538-1903 | |
| 106 | 538-6901 | | 538-6902 | | 538-6903 | |
| 107 | 538-5901 | | 538-5902 | | 538-5903 | |
| 108 | 538-4901 | | 538-4902 | | 538-4903 | |
| 101 | 538-2911 | | 538-2912 | | 538-2913 | |
| 102 | 538-7911 | | 538-7912 | | 538-7913 | |
| 103 | 538-3911 | | 538-3912 | | 538-3913 | |
| 104 | 538-1911 | | 538-1912 | | 538-1913 | |
| 106 | 538-6911 | | 538-6912 | | 538-6913 | |
| 107 | 538-5911 | | 538-5912 | | 538-5913 | |
| 108 | 538-4911 | | 538-4912 | | 538-4913 | |
| 101 | 538-2921 | 113 | 538-2922 | | 538-2923 | |
| 102 | 538-7921 | | 538-7922 | | 538-7923 | |
| 103 | 538-3921 | | 538-3922 | | 538-3923 | |
| 104 | 538-1921 | | 538-1922 | | 538-1923 | |
| 106 | 538-6921 | | 538-6922 | | 538-6923 | |
| 107 | 538-5921 | | 538-5922 | | 538-5923 | |
| 108 | 538-4921 | | 538-4922 | | 538-4923 | |

LEVEL 1 301 — rows with locations 101–108 (first block)
LEVEL 2 302 — rows with locations 101–108 (second block)
LEVEL 3 303 — rows with locations 101–108 (third block)

*FIG. 3*

| TABLE 3 FOR WIRELESS TERMINAL 112 ||
|---|---|
| LOCATION | ASSIGNED LEVEL NUMBER |
| 101 | NA |
| 102 | 3 |
| 103 | 1 |
| 104 | 2 |
| 106 | 3 |
| 107 | 3 |
| 108 | 3 |

FIG. 11

| TABLE 3 FOR WIRELESS TERMINAL 113 ||
|---|---|
| LOCATION | ASSIGNED LEVEL NUMBER |
| 101 | 3 |
| 102 | 2 |
| 103 | 2 |
| 104 | 2 |
| 106 | 2 |
| 107 | 2 |
| 108 | 2 |

AUTOMATIC REASSIGNMENT OF A TELEPHONE NUMBER OF A WIRELESS TERMINAL BASED ON LOCATION OF THE WIRELESS TERMINAL

TECHNICAL FIELD

This invention relates generally to wireless switching systems and, in particular, to the assignment of telephone numbers.

BACKGROUND OF THE INVENTION

In the modern business environment of today, individuals have different responsibilities and work in different job locations that change on an hourly basis or a daily basis. For example, an individual may be a secretary working at a particular desk for part of the day and a librarian working in a corporate library for the remainder of the day. In addition, within a department store, an individual may work in the shoe department for part of the day and work in the household department for the remainder of the day. At present, each of these departments has wired telephones which are permanently stationed in each of the areas where an individual may go to work. Department stores and many other businesses publish to their customers and clients the internal telephone number that may be dialed by an outside individual to reach a particular department. For example, a customer of a department store wishing to call the houseware department simply dials the direct number for that department.

With the advent of wireless telephones, companies have been forced to dedicate wireless telephones for each particular department having the telephone number assigned to that department. This presents many problems for companies. For example, a common problem is for an employee, after their shift is completed, to leave the department still carrying the wireless telephone; hence, the dedicated wireless telephone cannot be utilized by another employee coming on for the next shift. In addition, it is hard to determine precisely how many dedicated wireless telephones are needed for each particular department. Furthermore, if an employee comes into a particular department to lend temporary assistance for a matter of minutes, they must try to find a dedicated wireless telephone assigned to that department. In addition, within a particular department, individual employees may have different skill levels within that department which are different than another department. In addition, an employee may be the supervisor of one department but go to another department and be a mere worker. Such a transition would occur if the second department was in drastic need of assistance. To properly direct calls, the wireless switching system needs to take into account the skill level or managerial level of employees as they enter or leave various departments.

SUMMARY OF THE INVENTION

This invention is directed to solving these and other problems and disadvantages of the prior art. According to the invention, when a wireless terminal enters a new location, the telephone number assigned to the wireless terminal is automatically changed to a telephone number assigned to that location based on an assignment level of the wireless terminal for that location. Advantageously, the features associated with the wireless terminal will also be changed to the features assigned to the location. In addition, this invention allows flexibility for the telephone number of the wireless terminal to remain fixed and not to be changed to a telephone number assigned to a particular location. Advantageously, a wireless terminal has a plurality of assignment levels with different assignment levels being utilized for different locations. This allows the user of the wireless terminal to perform different functions within different locations. In addition, each wireless terminal has a personal telephone number assigned to it. The wireless telephone can use either its personal telephone number or the telephone number of the present location for purposes of caller identification during call originations.

These and other features and advantages of the present invention will become more apparent from the following description of an illustrative embodiment of the invention considered together with the drawing.

BRIEF DESCRIPTION OF THE DRAWING

FIGS. 2 and 4 illustrate a table that is maintained by a wireless switching system defining the relationship between the physical identification number of a wireless terminal and its assigned telephone number;

FIG. 3 illustrates a table that defines the telephone numbers assigned to each location;

FIGS. 11–13 illustrate a table maintained by a wireless switching system for each wireless terminal.

DETAILED DESCRIPTION

Figure 1:
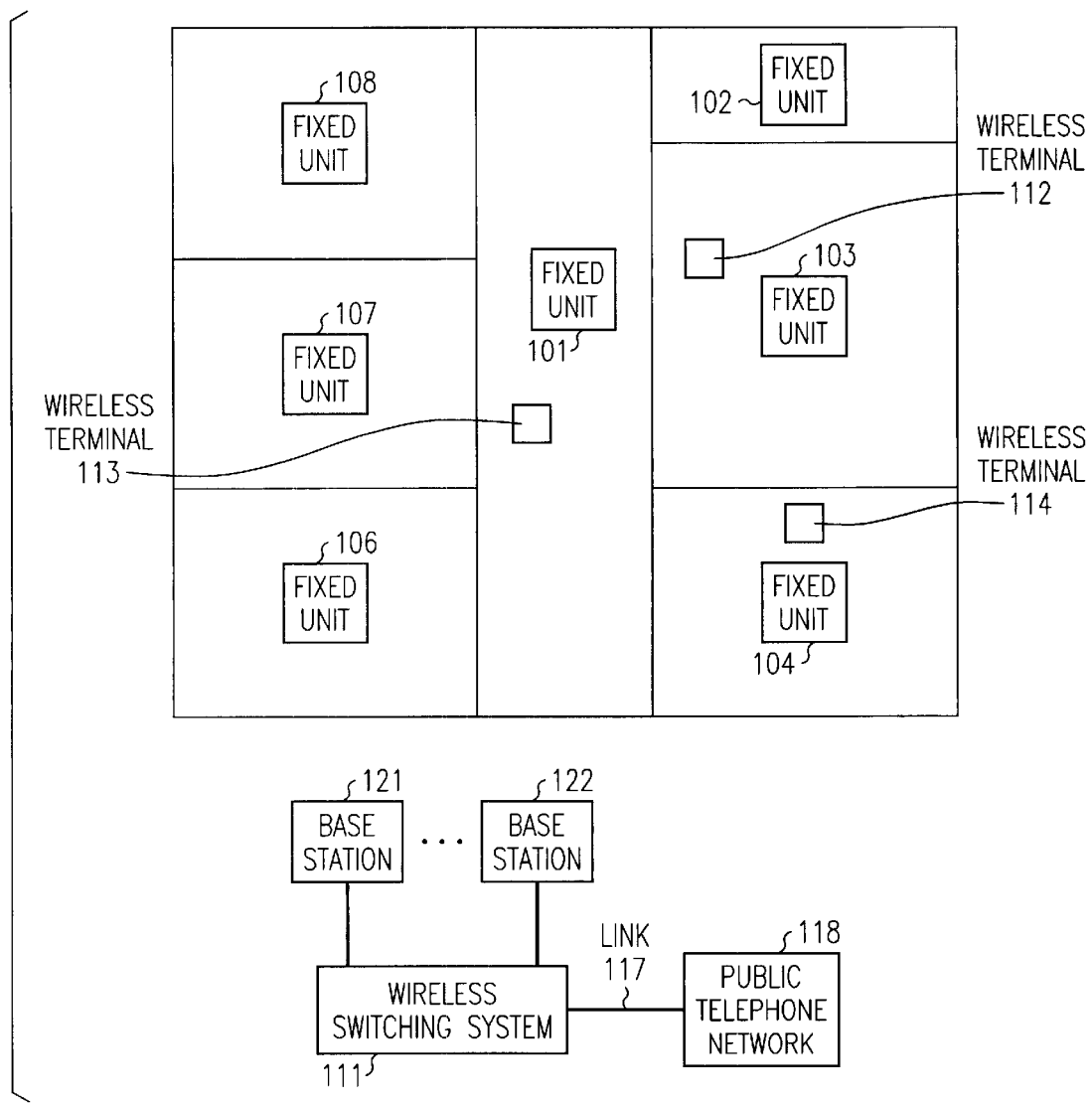
FIG. 1 is a block diagram of a wireless system for implementing the invention.

In FIG. 1, switching system 111 provides wireless service for wireless terminals 112–114 via base stations 121–122. Wireless switching system 111 is interconnected to public telephone network 118 via link 117. Wireless switching system 111 determines the location of a wireless terminal in the following manner. The location is designated with the same number as the fixed unit identifying that location. For example, fixed unit 101 provides the location information for location 101. A fixed unit transmits a signal at predefined intervals defining the identity of the fixed unit. This transmission occurs on a different transmission medium than that utilized by the wireless terminals to communicate with the base stations. For example, when wireless terminal 112 enters location 103, it receives the identification information defining fixed unit 103. Upon receiving identification information defining a new fixed unit, wireless terminal 112 transmits a data message to wireless switching system 111 and inform wireless switching system 111 that wireless terminal 112 is now receiving the identification information from fixed unit 103. Wireless switching system 111 then identifies that wireless terminal 112 is in location 103. One skilled in the art could readily see that other methods could be utilized to determine the location of a wireless terminal. For example, the wireless terminals could transmit identification information defining the wireless terminal to a fixed unit which then could relay this to wireless switching system 111 via wired or wireless media to wireless switching system 111. In addition, global positioning satellite (GPS) devices or base stations could be used to determine a position of a wireless terminal.

In accordance with the invention, when wireless switching system 111 receives information from wireless terminal 112 that it is in location 103, wireless switching system accesses Table 3 of FIG. 11 to determine what the assigned level number for wireless terminal 112 in location 101. From Table 3, wireless switching system 111 determines that the assigned number is a "1". Wireless switching system 111 then accesses Table 2 of FIG. 3 at Level 1 to obtain the telephone number for location 101 which in this example will be 538-3901. Wireless switching system 111 updates Table 2 of FIG. 3 as is illustrated in FIG. 3. Wireless switching system 111 then updates Table 1 to reflect that wireless terminal 112 is at location 103 and has the telephone number of 538-3901. If in Table 3 of FIG. 11, location 103 would have had an assignment level number of 3, wireless switching system 111 would have accessed Level 3 and obtained a telephone number of 538-2922 for wireless terminal 111. In addition, the Table 2 of FIG. 3 is updated to reflect that telephone number is assigned to wireless terminal 112. Both Tables 1–3 refer to the wireless terminals by designation numbers as illustrated in FIG. 1 for convenience of description. In actual implementation, the serial numbers of wireless terminals would be used instead of the designation numbers. A wireless terminal has a 12 digit serial number that is used to identify the wireless terminal to wireless switching system 111. The serial number is transmitted with each message to wireless switching system 111.

Consider now the example, where wireless terminal 112 moves from location 103 to location 104 via location 101. When wireless switching system 111 is informed by wireless terminal 112 that it is now in location 101, wireless switching system 111 determines from FIG. 2 that the assigned telephone number for wireless terminal 112 is not to be modified when the wireless terminal enters location 101. Consequently, wireless switching system 111 does not modify the current telephone number illustrated in Table 1 of FIG. 2 for wireless terminal 112. Further, consider when the wireless terminal moves to location 104. Upon being informed that wireless terminal 112 has entered location 104, wireless switching system 111 examines Table 3 of FIG. 11 and determines that the assigned level for wireless terminal 112 in location 104 is a "2". Based on this information, wireless switching 111 accesses Level 2 and determines that wireless terminal 112 should be assigned telephone number 538-1911. Hence, wireless switching system 111 assigns telephone number 538-1911 to wireless terminal 112. Table 1 of FIG. 2 is updated to reflect this change and the updated table is illustrated in FIG. 4. In addition, Table 2 of FIG. 3 would be updated to reflect the fact that wireless terminal 112 is now assigned telephone number 538-1911. If wireless terminal 114 had not been present in location 104 when wireless terminal 112 entered location 104 and Table 3 of FIG. 11 contained a "1" for location 104, wireless terminal 112 would have been assigned telephone number 538-1901. Table 2 of FIG. 3 will also be updated to reflect the fact that telephone number 538-3901 is no longer assigned to wireless terminal 112.

Since wireless terminal 112 has been assigned a new telephone number the features associated with that telephone number now are provided to wireless terminal 112 by wireless switching system 111. When a call is received from public telephone network 118 for telephone number 538-1902, wireless switching system 111 examines Table 1 of FIG. 4 and determines that the call should be routed to wireless terminal 112. One skilled in the art would readily recognize that the telephone numbers illustrated for each individual location in Table 2 could be placed in a hunt group by wireless switching system 111. Such a hunt group would allow a telephone call directed to a first number for a location to subsequently be transferred to a second number of the location if the first number of the location was busy.

Figure 5:
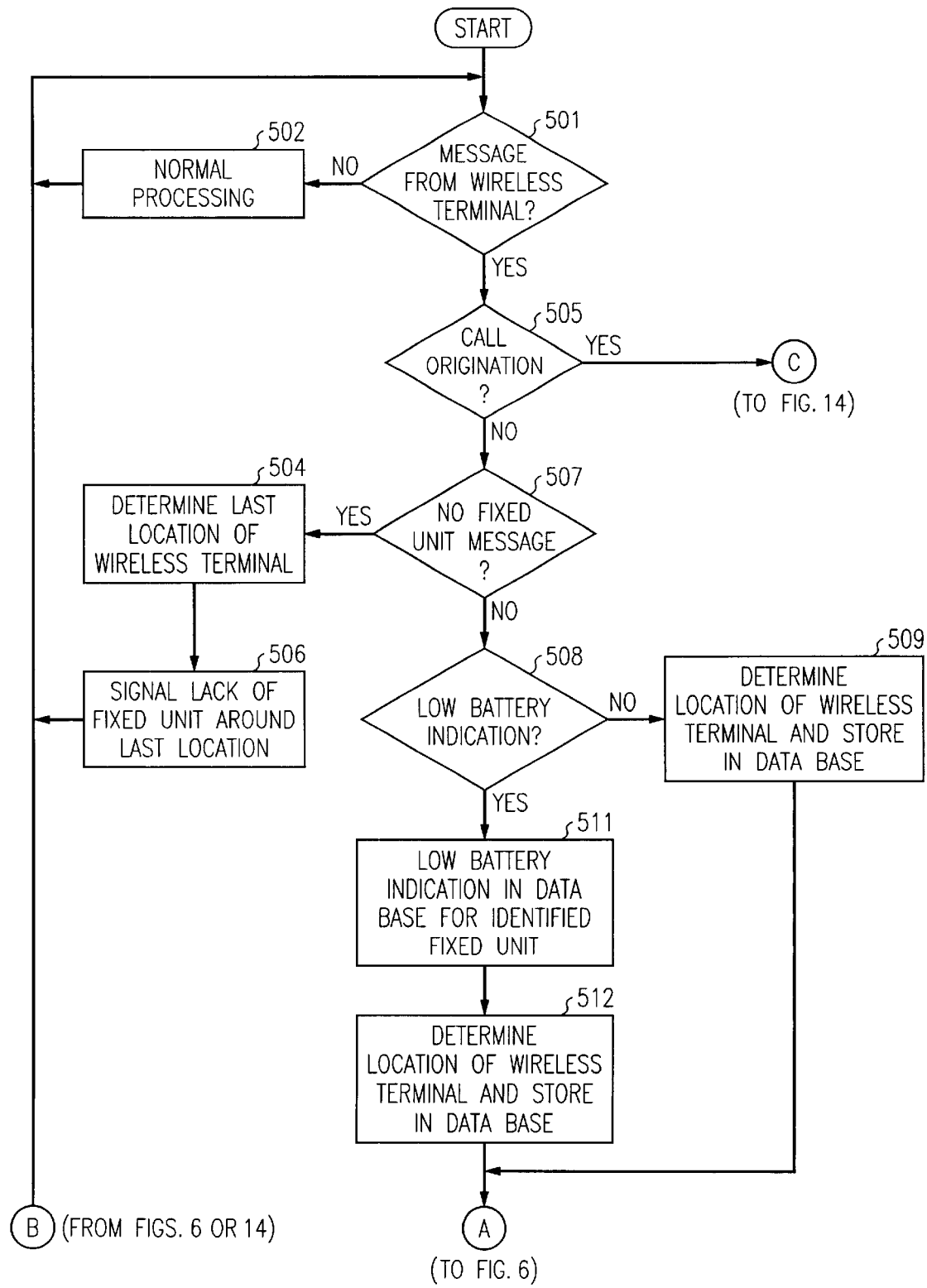
FIGS. 5 and 6 illustrate, in flow chart form, steps performed by a wireless switching system.
Figure 6:
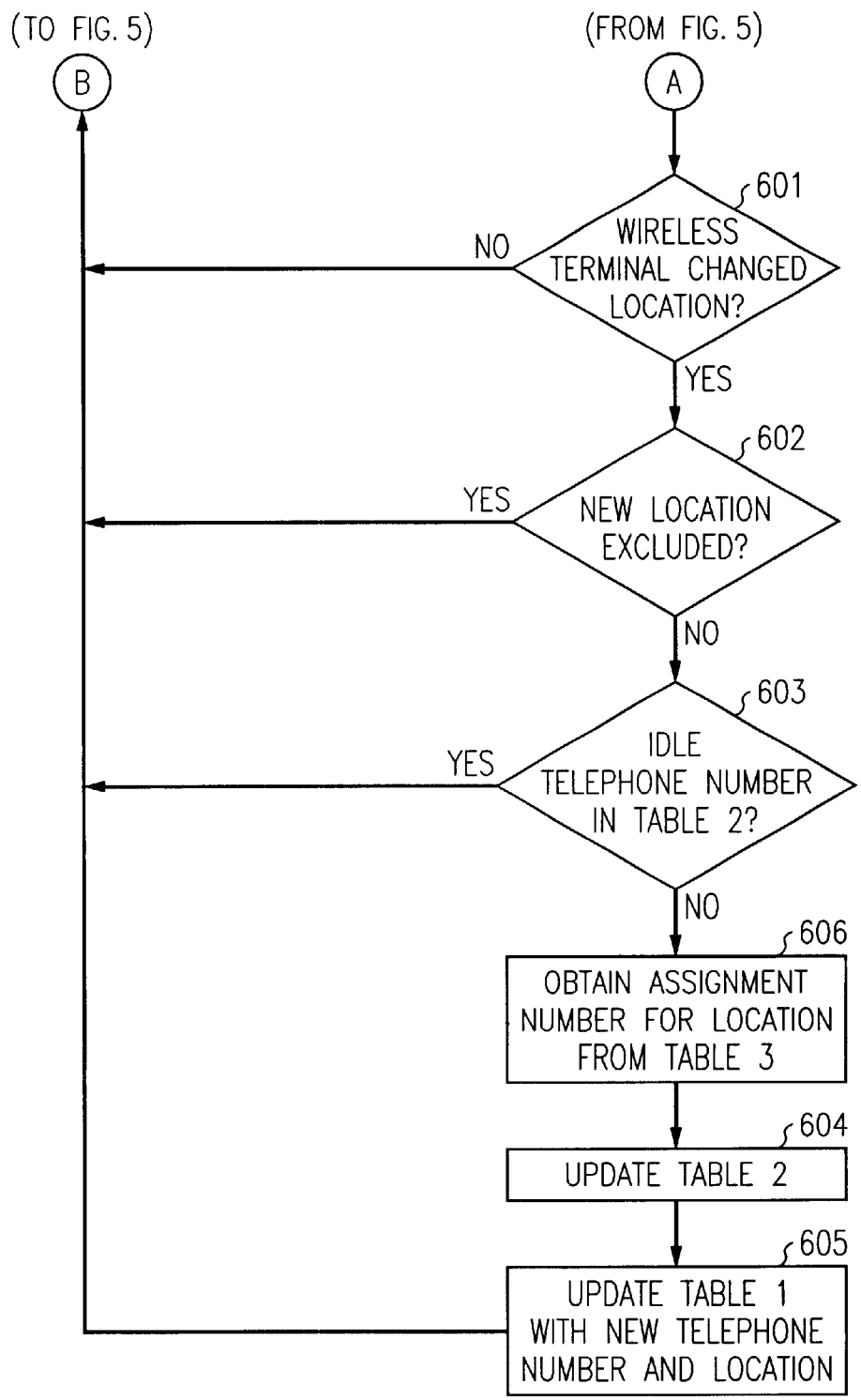

FIGS. 5 and 6 illustrate, in flowchart form, the steps performed by wireless switching system 111 in implementing the invention. Decision block 501 determines if there is a message from a wireless handset. If the answer is no, control is transferred to block 502 which performs normal processing before returning control back to decision block 501. If the answer in decision block 501 is yes, decision block 505 determines if a call origination is being performed by the wireless telephone. If the answer is yes, control is transferred to decision block 1401 of FIG. 14. If the answer is no, control is transferred to decision block 507. Decision block 507 determines if a "no fixed unit" message is being received from a wireless telephone. Such a message indicates that a wireless telephone is not receiving the transmission signal from any fixed unit. If the answer is yes in decision block 507, control is transferred to block 504 which determines the last known location. Wireless switching system 111 maintains a list of last known locations for each of the wireless terminals. Block 506 then signals that the wireless telephone cannot receive a fixed unit around the last location listed for the wireless telephone. This signaling may be in the form of a message displayed to an operator of wireless switching system 111 or merely a message being included in a maintenance log of wireless switching system 111. After execution of block 506, control is transferred back to decision block 501.

Returning to decision block 507, if the answer is no, decision block 508 determines if a low battery indication was included in the message identifying the fixed unit from the wireless telephone. If the answer is no in decision block 508, block 509 determines the location based on the identification code of the fixed unit of the wireless telephone before transferring control to decision block 601 of FIG. 6. If the answer in decision block 508 is yes, the low battery indication for the identified fixed unit is placed in the database, and a maintenance message indicating low battery is generated before transferring control to block 512. Block 512 performs the same operations as block 509 before transferring control to decision block 601 of FIG. 6.

After the determination of the location of a wireless terminal has been made in either block 509 or 512, control is transferred to decision block 601 of FIG. 6. The latter decision block determines if the location of the wireless terminal has changed by examining Table 1 of FIGS. 2 or 4. If the answer is no, control is transferred back to decision block 501 of FIG. 5. If the answer in decision block 601 is yes, control is transferred to decision block 602 which examines Table 1 of FIGS. 2 or 4 to determine if the new location is excluded for the wireless terminal. If the answer is yes, control is transferred back to decision block 501 of FIG. 5. In the previous example, when wireless terminal 112 entered location 101, decision block 602 would have determined from FIG. 2 that location 101 was excluded for wireless terminal 112.

If the answer is no in decision block 602, control is transferred to decision block 603. The latter decision block examines Table 2 of FIG. 3 to determine if there are any idle telephone numbers associated with the new location. If there are no idle telephone numbers associated with the new location the wireless terminal's telephone number cannot be changed and remains the same as for the previous location.

Note, that the present location in Table 1 of FIG. 2 is not updated to reflect the new location and remains set to the old location. The next time that the wireless terminal transmits its location, decision block 601 once again detects a change in location and once again control is transferred to decision block 603 to see if there is now a idle telephone number in Table 2 for the new location. If the answer in decision block 603 is no, control is transferred back to decision block 501 of FIG. 1. If the answer in decision block 603 is yes, control is transferred to block 606 which accesses Table 3 and determines the assigned level number for the new location before transferring control to block 604. The latter block then uses the assigned level number and the location information to access the appropriate level of Table 2 of FIG. 3. Block 604 then determines what the assigned telephone number should be in that Table 2. Block 604 also updates Table 2 to reflect the new telephone number that is assigned to the wireless terminal and to remove the indication that the old telephone number is assigned to the wireless terminal. After execution of block 604, control is transferred to block 605 which updates Table 1 for the assigned telephone number for the wireless terminal and to indicate the present location as the new location. After execution of block 605, control is transferred back to decision block 501 of FIG. 5.

Figures 13, 14:
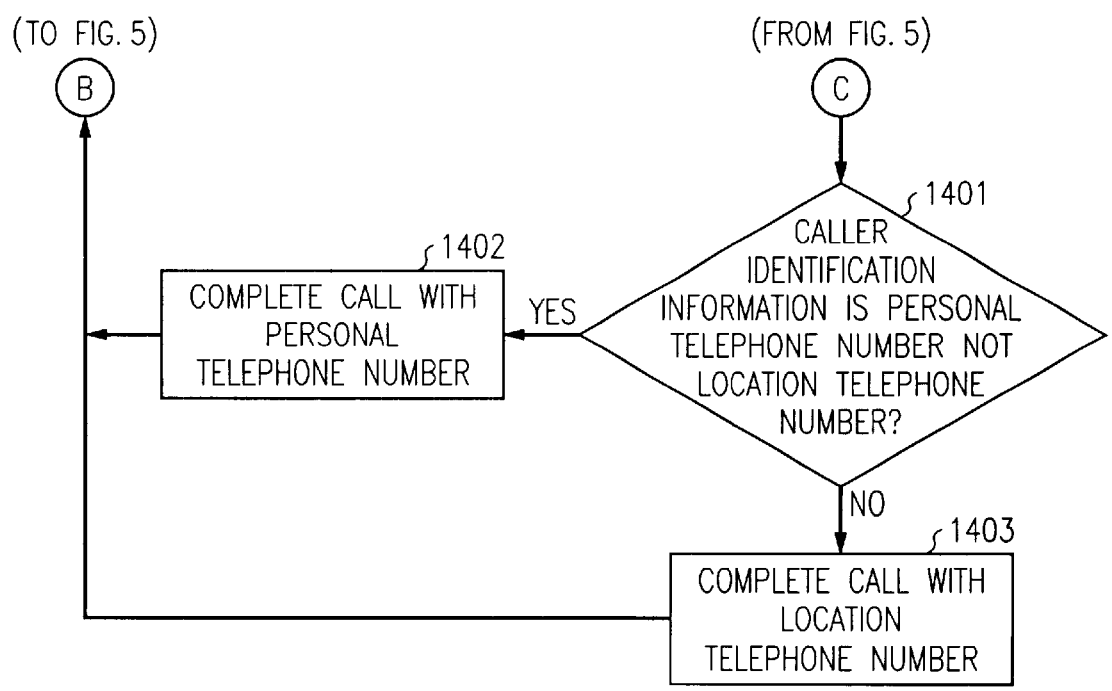

Returning to decision block 505 of FIG. 5, if the answer is yes, control is transferred to decision block 1401 of FIG. 14. Decision block 1401 determines if the personal telephone number of the wireless terminal is to be utilized or the location telephone number of the wireless terminal's present location is to be used for the caller identification information during a call origination. If the personal telephone number is to be utilized, the call is completed by block 1402. If the location telephone number is to be utilized, the call is completed by block 1403. After execution of either block 1402 or 1403, control is transferred back to decision block 501 of FIG. 5.

Figure 7:
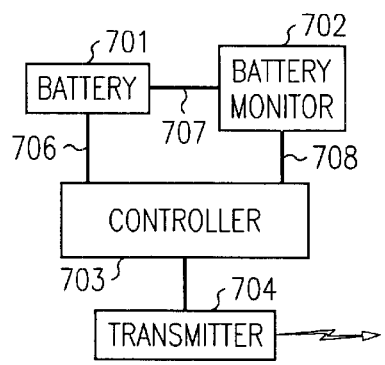
FIG. 7 illustrates, in block diagram form, a fixed unit.

FIG. 7 illustrates in block diagram form a fixed unit. The fixed unit of FIG. 7 is powered by battery 701. However, one skilled in the art could readily see that normal building AC power could also be utilized to power the fixed unit. Controller 703 periodically transmits the identification code for the fixed unit via transmitter 704. Advantageously, transmitter 704 can be transmitting utilizing infrared transmission or ultrasonic transmission. Transmitters for transmitting either infrared or ultrasonic are well known in the art. If controller 703 detects that battery 701 is at a low power level via conductor 707, battery monitor 702, and conductor 708, controller 703 sets alarm indicator 705 and transmits the low power indication along with the identification code via transmitter 704.

Figure 8:
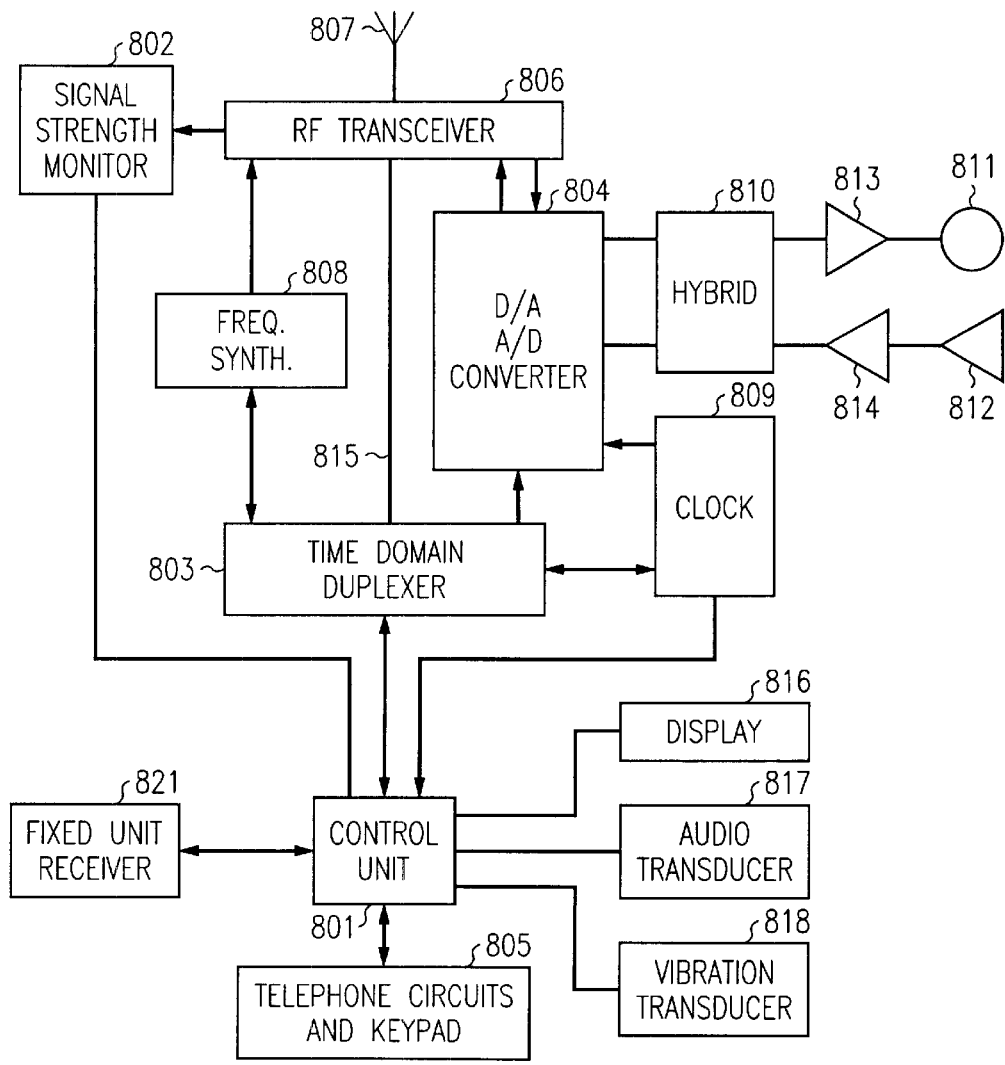
FIG. 8 illustrates, in block diagram form, a wireless terminal.

Wireless handset 112 is illustrated in greater detail in FIG. 8. Wireless handset 112 implements a wireless protocol that allows wireless handset 112 to transmit data messages to wireless switching system 111 via base stations 121–122. One air interface that can be used is the Common Air Interface (CAI) specification for Cordless Telephony 2 (CT2), Release 2, I-ETS 300 131. The data message is a layer 3 message. Particularly, the data message is transported as a feature activation class 3 of the TERMCAP IE using a new value. Overall control of the wireless handset is provided by control unit 801. Units 802, 803, 806, 807, 808, and 809 provide the RF communication capabilities for the wireless handset. Elements 804, 810, and 811–814 provide the audio information received and transmitted to the user; whereas, elements 816-818 and 805 provide the basic user interface. The CT2 protocol allows control unit 801 to transmit data messages to wireless switching system 111.

Control unit 801 utilizes these data messages to transmit identification information for fixed units to wireless switching system 111. Fixed unit receiver 321 receives the identification code of a fixed unit and transfers this identification code to control unit 801 for transmission to wireless switching system 111. Fixed unit receiver 321 is of a design well known in the art for either infrared or ultrasonic transmission media. One skilled in the art could readily see that fixed unit receiver 321 could provide to control unit 801 the signal strength of the received signal. Further, control unit 801 could also tune fixed unit receiver 321 to receive different frequencies or other variations of the transmission media using well known techniques in the art.

Figure 9:
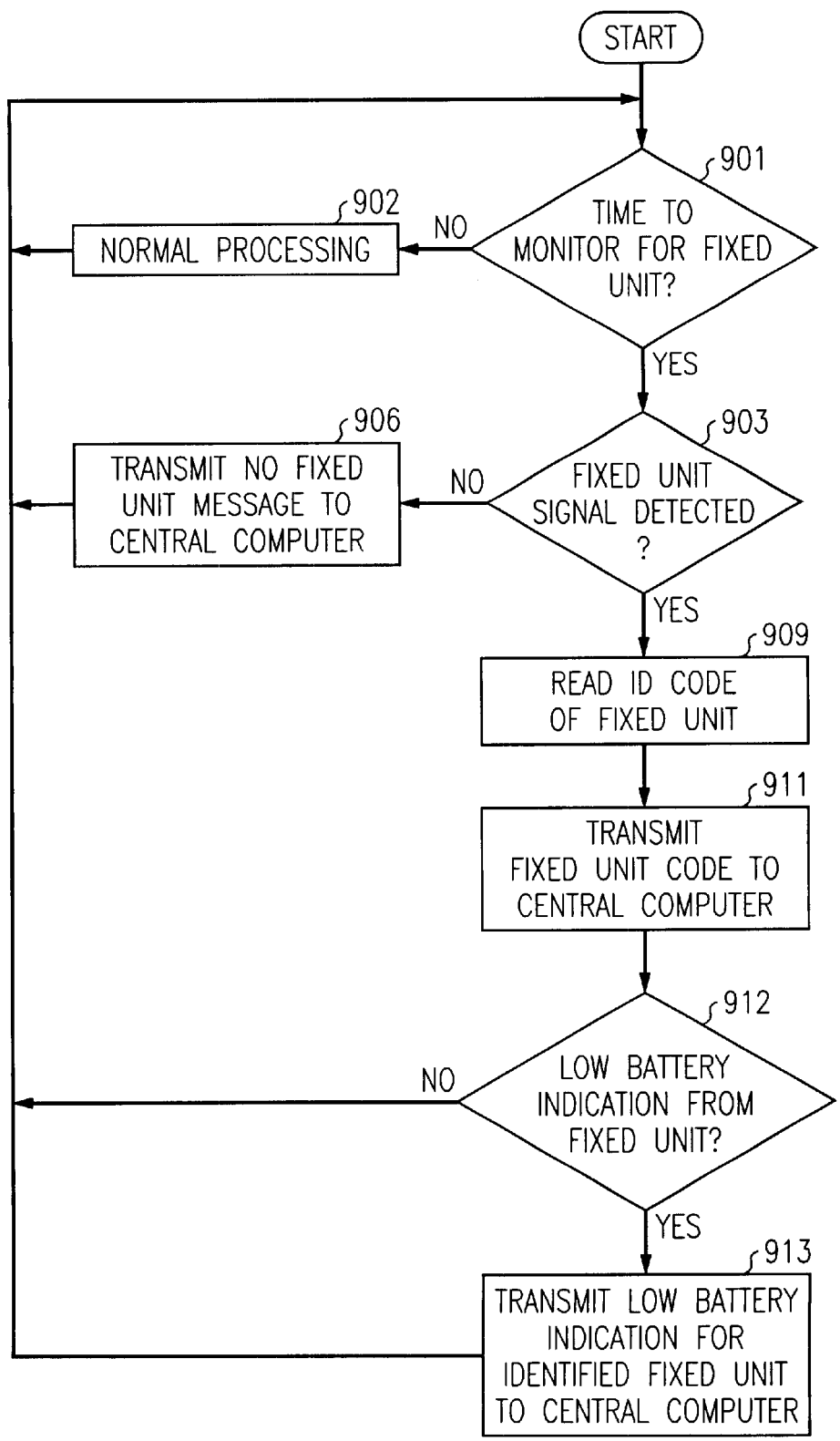
FIG. 9 illustrates, in flow chart form, steps performed by a wireless terminal.

FIG. 9 illustrates the steps performed by a wireless terminal such as wireless handset 113. Decision block 901 determines if the time has elapsed to monitor for a fixed unit. Advantageously, every second the wireless handset monitors to determine if the transmission signal of a fixed unit is being received. If the answer in decision block 901 is no, normal processing is performed by block 902 before control is returned back to decision block 901.

If the answer in decision block 901 is yes, control is transferred to decision block 903 which determines if a transmission signal is being detected. If the answer in decision block 903 is no, control is transferred to block 906. The wireless handset transmits a "no fixed unit" message to the central computer by execution of block 906 before transferring control back to decision block 901. Returning to decision block 903, if the answer is yes, control is transferred to block 909. The latter block determines the identification code of the fixed unit whose transmission signal is being received, and block 911 transmits the received identification code to wireless switching system 111 before transferring control to decision block 912. Decision block 912 determines if a low battery indication was included in the transmission signal from the fixed unit. If the answer is no, control is transferred back to decision block 901. If the answer in decision block 912 is yes, block 913 transmits a low battery indication message to wireless switching system 111 for the identified fixed unit.

Figure 10:
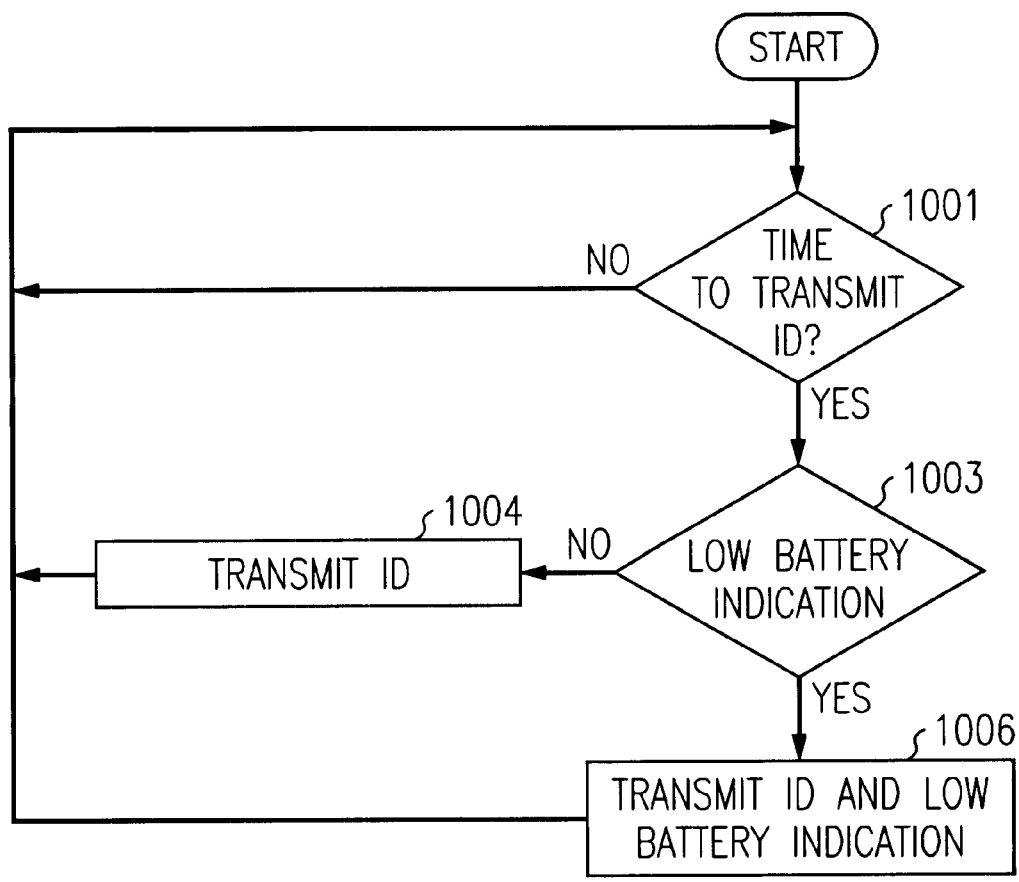
FIG. 10 illustrates, in flow chart form, steps performed by a fixed unit.

FIG. 10 illustrates the steps performed by a fixed unit. Decision block 1001 determines if it is time to transmit the identification code of the fixed unit. Advantageously, the identification code is transmitted every tenth of a second. If the answer is no, control is transferred back to decision block 1001. If the answer is yes, decision block 1003 determines if battery monitor 702 of FIG. 7 is indicating a low battery. If the answer is no, block 1004 simply transmits the identification code of the fixed unit before transferring control back to decision block 1001. If the answer in decision block 1003 is yes, block 1006 transmits a message that includes the identification code and a low battery indication before transferring control back to decision block 1001.

Of course, various changes and modifications to the illustrative embodiment described above will be apparent to those skilled in the art. These changes and modifications can be made without departing from the spirit and the scope of the invention and without diminishing its attendant advantages. It is therefore intended that such changes and modifications be covered by the following claims.

What is claimed is:

1. A method of administering telecommunication numbers for a wireless terminal, comprising the steps of:

determining in which one of a plurality of locations the wireless terminal is located;

determining first assignment level that is based on a first skill level of a user of the wireless terminal in the one of the plurality of locations;

identifying a first telecommunication number assigned to the one of the plurality of locations for the determined first assignment level;

assigning the first telecommunication number assigned to the one of the plurality of locations to the wireless terminal;

determining that the wireless terminal has relocated to another one of the plurality of locations;

determining a second assignment level that is based on a second skill level of the user of the wireless terminal in the other one of the plurality of locations;

identifying a first telecommunication number assigned to the other one of the plurality of locations for the determined second assignment level; and assigning the first telecommunication assigned to the other one of the plurality of locations to the wireless terminal.

2. The method of claim 1 wherein the step of determining the location further determining that another wireless terminal whose user has the first skill level in the one of plurality of locations for the first assignment level has just located in the one of the plurality locations:

identifying another one of the plurality of telecommunication numbers assigned to the one of the plurality of locations for the determined first assignment level; and assigning the other one of the plurality of telecommunication numbers assigned to the one of the plurality of locations for the first assignment level to the other wireless terminal.

3. The method of claim 1 wherein the step of determining the location further determining that another wireless terminal with a third level that is based on a second skill level of a user of the other wireless terminal in the one of the plurality of locations has just located in the one of the plurality of locations:

identifying a third one of the plurality of telecommunication numbers assigned to the one of the plurality of locations for the determined third assignment level; and assigning the third one of the plurality of telecommunication numbers assigned to the one of the plurality of locations for the determined third assignment level to the other wireless terminal.

4. The method of claim 3 wherein the wireless terminal has a personal telephone number and the method further comprises the step of specifying that the personal telephone number is used for call identification information on call origination or the one of the plurality of telecommunication numbers assigned to the one of the plurality of locations for the determined first assignment level is used for call identification information on call origination by administration.

5. The method of claim 3 wherein the step of determining location comprises the step of transmitting location information by the wireless terminal to a wireless switching system that provides telecommunication service for the wireless terminal; and providing the one of the plurality of locations to the wireless terminal in response to transmitted location information by the wireless switching system.

6. The method of claim 5 further comprises receiving the location information by the wireless terminal from a fixed unit within the one of the plurality of locations.

7. An apparatus for performing the method of claim 1.

8. An apparatus for performing the method of claim 2.

9. An apparatus for performing the method of claim 3.

* * * * *